(12) United States Patent
Brewer et al.

(10) Patent No.: US 7,322,315 B2
(45) Date of Patent: Jan. 29, 2008

(54) PET HOUSE

(75) Inventors: Charles Brewer, Linn Creek, MO (US); William N. Whitlock, Osage Beach, MO (US)

(73) Assignee: Maze Innovations, Inc. MO (US)

( * ) Notice: Subject to any disclaimer, the term of this patent is extended or adjusted under 35 U.S.C. 154(b) by 0 days.

(21) Appl. No.: 10/698,621

(22) Filed: Oct. 30, 2003

(65) Prior Publication Data

US 2005/0103279 A1 May 19, 2005

(51) Int. Cl.
*A01K 1/03* (2006.01)
(52) U.S. Cl. .................. 119/498; 119/474; 119/484; 135/87
(58) Field of Classification Search ............. 119/498, 119/474, 484, 485, 786; 135/137, 87
See application file for complete search history.

(56) References Cited

U.S. PATENT DOCUMENTS

| | | | | |
|---|---|---|---|---|
| 3,156,213 | A | * | 11/1964 | Patten ......................... 119/497 |
| 3,848,279 | A | * | 11/1974 | Ipsen, Jr. ....................... 5/113 |
| 4,161,924 | A | * | 7/1979 | Welker ........................ 119/482 |
| 4,793,286 | A | * | 12/1988 | Buxton ........................ 119/498 |
| 5,072,694 | A | * | 12/1991 | Haynes et al. ............... 119/482 |
| 5,193,327 | A | * | 3/1993 | Goodenberger ............ 52/747.1 |
| 5,642,750 | A | * | 7/1997 | Brown et al. ................ 135/137 |
| 5,660,005 | A | * | 8/1997 | Tacoma ....................... 52/93.2 |
| 5,964,190 | A | | 10/1999 | Willinger et al. |
| 6,098,218 | A | * | 8/2000 | Ventura .......................... 5/113 |
| 6,192,909 | B1 | * | 2/2001 | Strausser .................... 135/137 |
| 6,338,314 | B1 | * | 1/2002 | Widrich ...................... 119/28.5 |
| 6,644,329 | B2 | * | 11/2003 | Tomason ...................... 135/96 |
| 6,647,924 | B1 | * | 11/2003 | Zwicker et al. ............. 119/452 |
| 6,708,451 | B1 | * | 3/2004 | Gomes ........................ 52/2.17 |
| 6,915,761 | B1 | * | 7/2005 | Campbell ................ 119/51.01 |
| 7,047,991 | B2 | * | 5/2006 | Kline .......................... 135/96 |

(Continued)

FOREIGN PATENT DOCUMENTS

AU 9724937 6/1997

(Continued)

OTHER PUBLICATIONS

Pettails.com, Pet Cot Dog Bed, www.pettails.com/petcotdogbed.html Jul. 2, 2003.

(Continued)

*Primary Examiner*—Yvonne R. Abbott
(74) *Attorney, Agent, or Firm*—Thorpe North & Western LLP (57) ABSTRACT

A lightweight, collapsible pet house includes a lower frame which supports a raised pet supporting floor and an upper frame cooperable with the lower frame and removable with respect thereto which supports a cover forming the roof and walls over the floor of the pet house. The lower frame and pet supporting floor can be used alone as a pet cot. The pet supporting floor is preferably made of a mesh material to promote air circulation around an animal resting on the floor and a vent in the roof and an entrance to the house promote air circulation through the house. The frames are advantageously made of PVC piping and connectors for the piping so can be easily assembled and disassembled so the house can be easily transported and stored and the floor and cover easily cleaned.

20 Claims, 7 Drawing Sheets

U.S. PATENT DOCUMENTS

2004/0194724 A1* 10/2004 Wood .................. 119/474

FOREIGN PATENT DOCUMENTS

EP        0567 437 A2    4/1993
JP        2001112366 A   10/1999

OTHER PUBLICATIONS

Petsmart.com, Canine Cot Dog Bed www.petsmart.com/dog/shopping/beds/specialty_beds/products/product_25015.shtml Jul. 2, 2003.

Calling All Dogs; Sweet Dreams; Pup Tent—an indoor pet house www.callingalldogs.com/products/sweet/dog)houses_beds.htm Jul. 2, 2003.

Nylabone Canine Habitat Collapsible Dog House Jul. 2, 2003 www.save2much.com/buy/search/Nylabone_Canine_Habitat_Collapsible_Dog_House.

Petsmart.com Travel Time Portable Pet House Jul. 3, 2003 www.petsmart.com/dog/shopping/new_adult_dog/products/product_29012.shtml.

* cited by examiner

PET HOUSE

BACKGROUND OF THE INVENTION

1. Field

The invention is in the field of dog and other pet houses.

2. State of the Art

Small structures for housing pets are common and come in a wide variety of shapes, sizes, and materials. Pet houses have been built with wood, plastic, and different types of fabric. Each type of material has its own advantages and disadvantages. Both wood and plastic doghouses are cumbersome to move and assemble. Even so-called portable doghouses made from plastic tend to be heavy and bulky making them difficult to fold up and transport. Fabric pet houses solve the mobility problem as they weigh less and fold more easily than their plastic counterparts. Unfortunately, fabric pet houses have several unique problems. First, fabric pet houses are often ill-ventilated. During the summer an ill-ventilated pet house can lead to heatstroke and the death of the animal. Others have too much ventilation and provide little protection against the elements. The current fabric houses are in direct contact with the ground, subjecting the animal to excessive cold, heat, moisture, and pests. In addition, fabric pet houses are difficult to clean. Dirt from the animal living in the house gets trapped inside the structure and is not easily removed.

Cots for pets have been designed to minimize the chance of heat stroke. The existing cot structures for pets do not have a roof. This leaves the animal open to the elements. Because of the serious deficiencies present in current pet house designs, a need exists for a pet house that is easily transported, provides both adequate ventilation and protection from the elements, and can be readily cleaned.

SUMMARY

The present invention fills the need for an improved pet house that can be transported easily, provides both ventilation and protection from the elements for a pet when in the pet house, and is easy to clean. The pet house of the invention has two separate portions: a lower cot portion that makes up the floor of the pet house and an upper, roof/wall portion that makes up the roof and walls of the pet house and which is attached to the cot portion. The framework of both portions can be constructed of any lightweight material, such as lengths of PVC pipe, and can fit together without glue. This allows the frame to be pulled apart to disassemble the pet house when it is desired to transport or store the pet house.

The bottom portion of the pet house is a rectangular-shaped cot with four legs. A lightweight piece of fabric is stretched over the famework. The legs keep the animal up off the ground helping protect it from heat, moisture, and pests. The lightweight fabric allows air to pass up through the bottom of the cot to keep the animal resting on it cool. Mesh is an ideal fabric choice as the holes in it are large enough to pass a sufficient amount of air to properly cool the animal, but are small enough to not be considered a nuisance to the animal. A mesh material also helps keep the animal and house clean as it brushes the dirt from the animal's fur when the animal rubs against it. The dirt particles can then pass through the mesh and settle on the ground beneath the pet house. Because the fabric is a flat-piece of material stretched over the cot frame, cleaning is very simple. The fabric can be removed when desired and washed.

The frame of the upper roof/wall portion of the house is removably attached to the lower cot portion frame. A fabric that has been sewn into a shape to substantially match the upper portion frame is then pulled over the frame to form the roof and walls of the house. The fabric should be a fabric that provides some protection from the elements, such as nylon. A heavy nylon will keep the animal warm during the winter. The frame for the upper portion of the pet house attaches to the cot frame using normal pipe connectors. The same connectors used to connect the legs of the cot to the frame can also be used to attach the frame of the upper portion of the house to the cot. This minimizes the amount of framing needed.

An open or mesh vent can be put in the top of the roof portion of the house so that air can flow through the pet house during warm weather. The panel can be covered when extra ventilation is not needed, such as in cold weather when it is desirable to maintain warmth in the house, using a flap of material.

Since the roof/wall portion of the house is independent from the cot portion, the roof/house portion can be removed to leave just the pet cot during the day for extra cooling. The roof/wall portion may be reattached later when needed.

For colder climates, insulation material, such as a blanket, thick nylon, or other thermally protective cloth or other material can be draped over or otherwise attached to the roof and walls of the pet house to provide the animal with extra warmth. A blanket or other insulating material may also be placed over the cot portion during cold weather to provide extra warmth.

BRIEF DESCRIPTION OF THE DRAWINGS

The best mode currently contemplated for carrying out the invention in actual practice is shown in the accompany drawings, in which.

DETAILED DESCRIPTION OF PREFERRED EMBODIMENT

Figure 1:
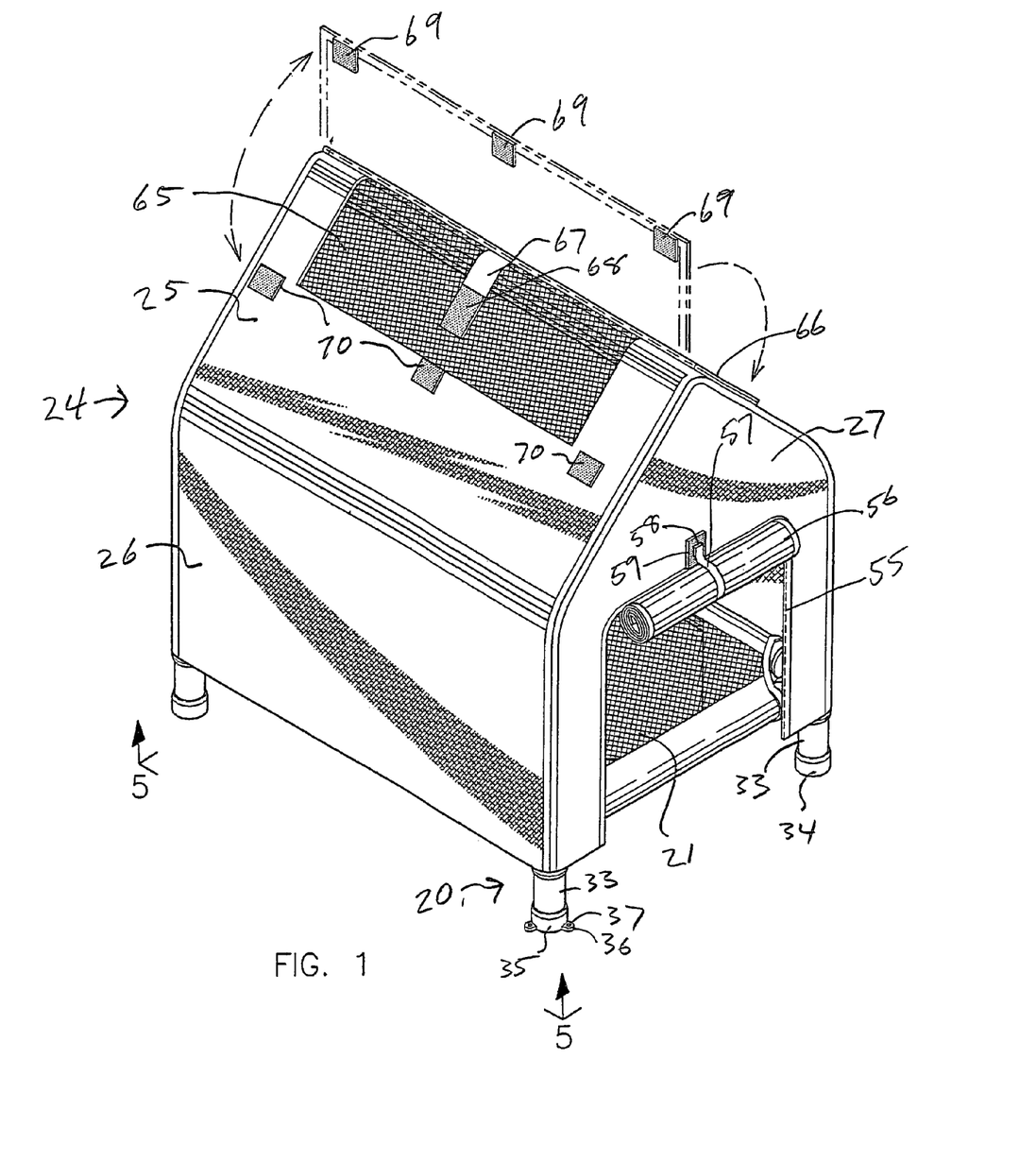
FIG. 1 is a pictorial view of the completely assembled pet house with zippered door rolled up and secured with a Velcro strap and top flap open for ventilation and showing how the top flap would be closed.
Figure 2:
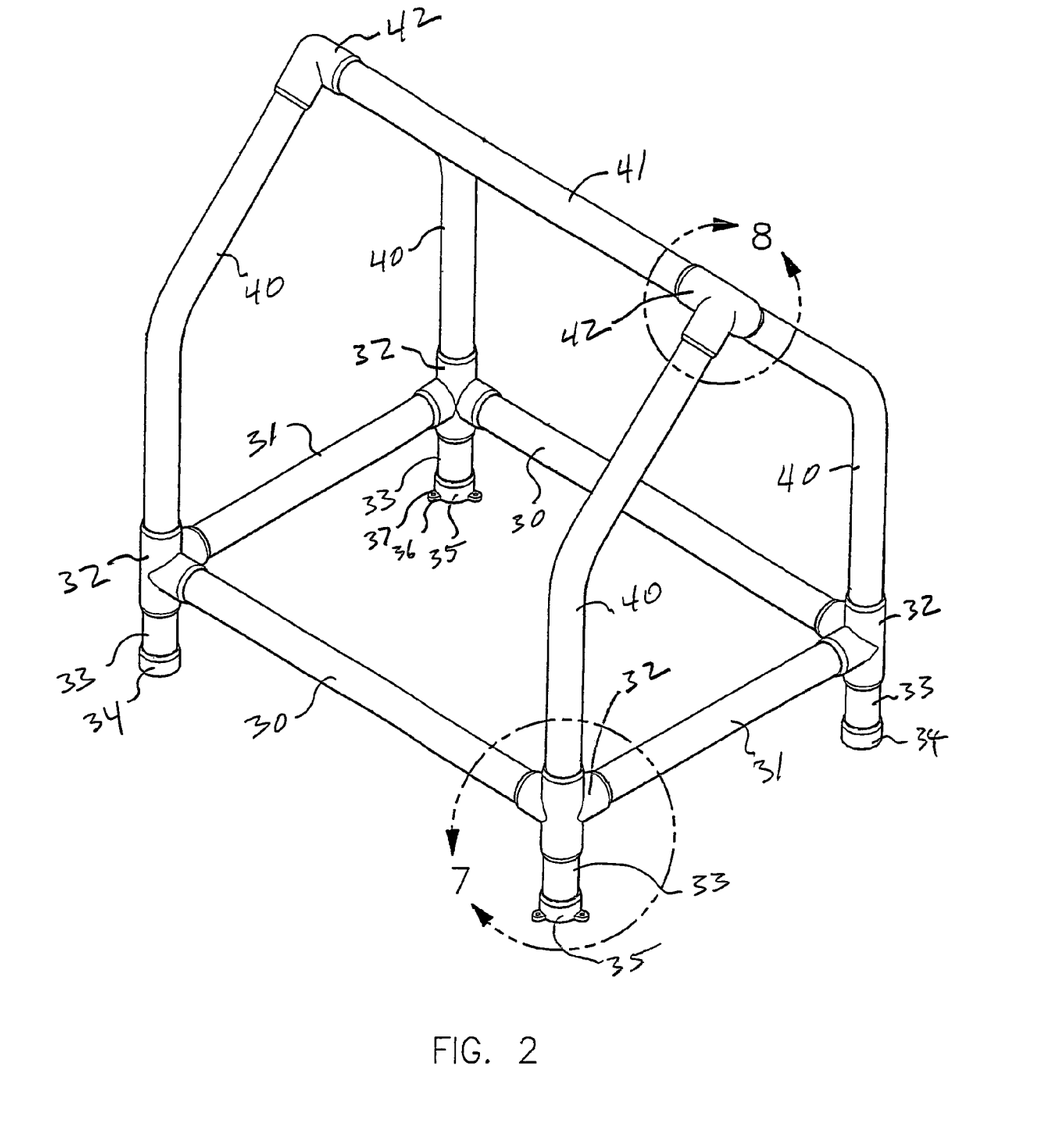
FIG. 2, a pictorial view of the assembled cot and house frame.
Figure 7:
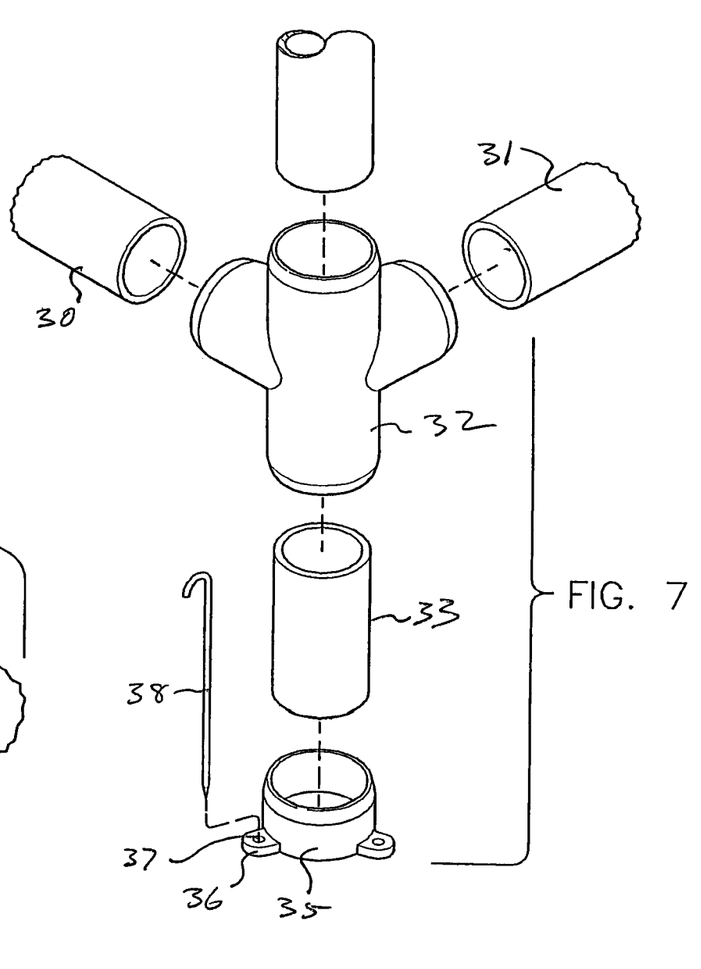
FIG. 7, a pictorial exploded view of a typical four-way connector, ground cap, and stake assembly of the cot frame within the arrows 7 of FIG. 2.
Figure 8:
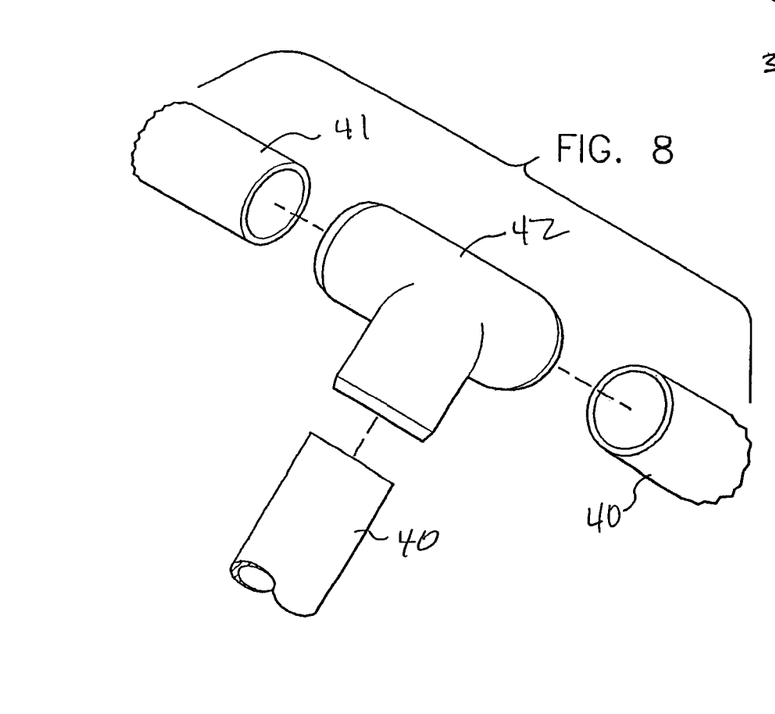
FIG. 8, a pictorial exploded view of a typical four-way connector, ground cap, and stake assembly of the upper frame within the arrows 8 of FIG. 2.
Figure 10:
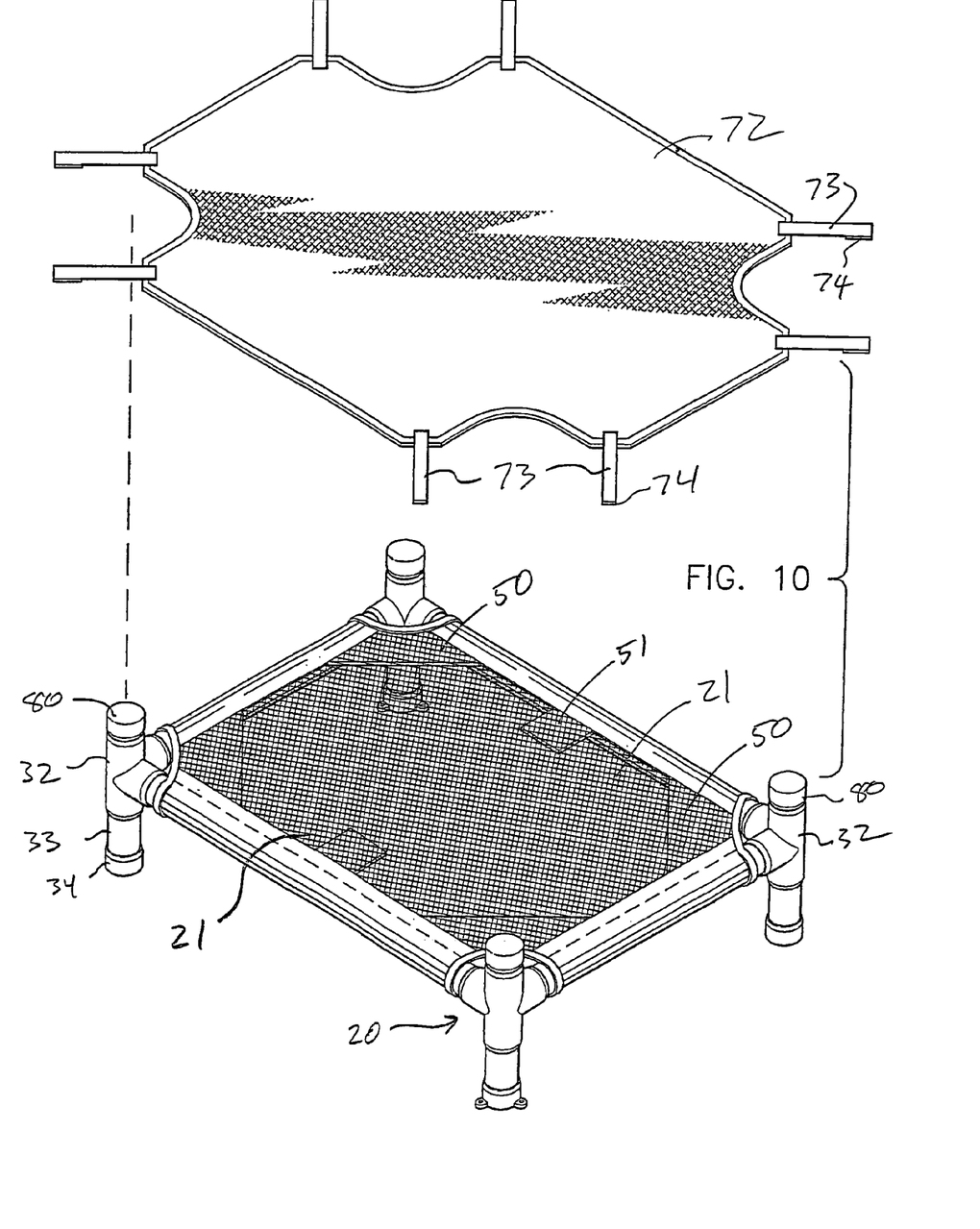
FIG. 10, an exploded pictorial view of the complete cot assembly with the bed pad that can be attached to the frame over the mesh bed.

The pet house of the invention includes a lower, cot portion 20, FIGS. 1 and 10, which forms a pet supporting floor 21, and an upper roof and wall portion 24, FIG. 1, forming the roof 25, side walls 26, and end walls 27 of the pet house. The lower cot portion includes a lower frame made up of opposite side members 30, see particularly FIG. 2, opposite end members 31, corner connectors 32, and legs 33. Feet are provided on the bottom of legs 33 which may be either plain feet 34 or anchoring feet 35 having tabs 36 with holes 37 therethrough to receive stakes 38, FIG. 7, which can be used to anchor the pet house to the ground when used out of doors. Stakes 37 may be similar to stakes typically used with tents to secure the tents to the ground, particularly in windy weather. As shown in FIGS. 1, 2, and 10, a combination of feet may be used with two plain feet 34 and two anchoring feet 35. The feet are preferably made of a soft plastic or rubber material to protect a floor upon which the pet house may be placed, particularly when used indoors. The upper roof and wall portion includes an upper frame made up of side members 40, a top member 41, and connectors 42. Side members 40 are connected to connectors 32 of the lower frame.

Figure 3:
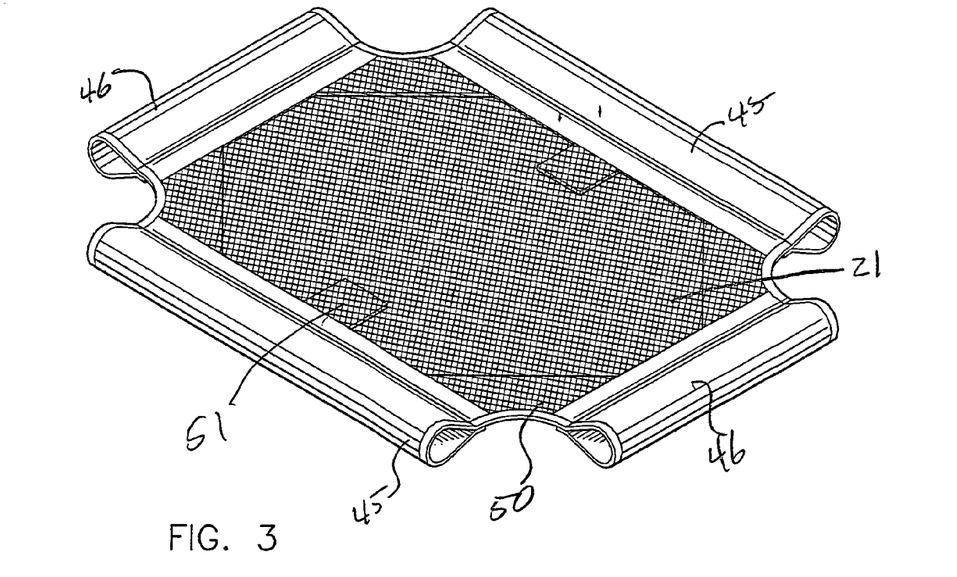
FIG. 3, a pictorial view of the mesh bed for the cot removed from the frame.
Figure 4:
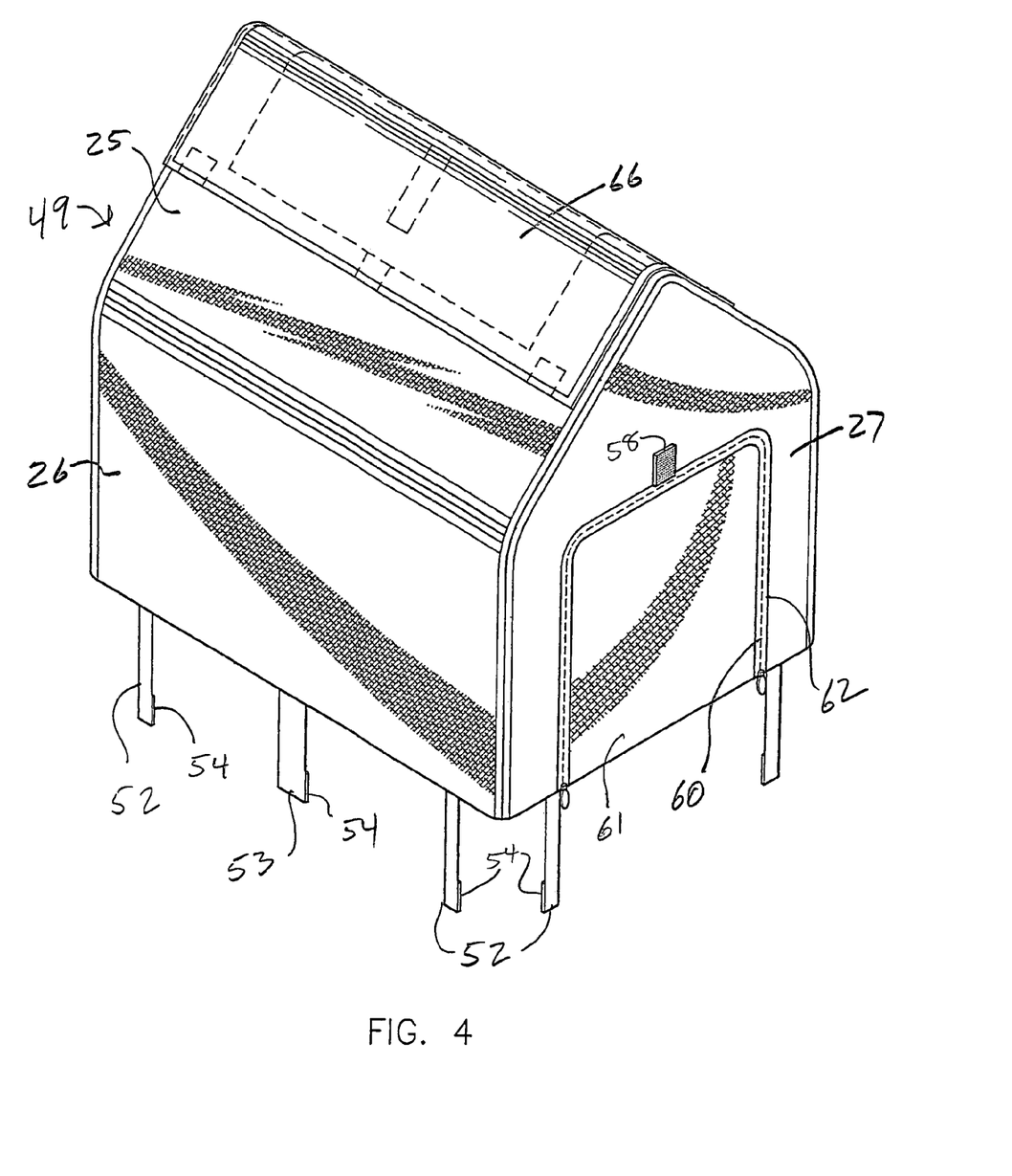
FIG. 4, a pictorial view of the fabric that covers the house fame and forms the roof and walls and with zippered door and top ventilation flaps closed and with Velcro attachment straps hanging from the bottom.

The frame may be made of various materials, but it is currently preferred to make the frame of PVC pipe, such as PVC sprinkler pipe with PVC pipe connectors. Such pipe and connectors are readily available at low cost. As illustrated in FIG. 4, readily available three and four pipe ninety degree connectors are used. Also, PVC pipe may be easily bent during manufacture of the house to form the side members 40. While various angles of bend may be used to provide any desired configuration to the roof of the house, it is preferred that the angle be such that the top ends of the upper side members come together at ninety degrees or other standard angle so a standard PVC connector, such as a ninety degree connector as shown, can be used. With readily available PVC pipe and connectors, the pipe may be easily inserted into or removed from the connectors for assembly and disassembly of the frame. With the configuration illustrated, particularly as seen in FIG. 3, it is easy to assemble the lower cot frame, which may be used alone as a cot as shown in FIG. 10, and the upper frame may then be easily attached to the lower frame to complete the frame for the house.

The pet supporting floor 21 is formed of material, such as a fabric material, supported by lower frame side pieces 30 and end pieces 31. The material may be fastened around the frame using any known method such as snaps, hook and loop connectors commonly available under the trademark VELCRO, or other connectors. However, it is presently preferred to form side sleeves 45, FIG. 3, along the side edges of the material and end sleeves 46 along the end edges of the material. Such sleeves can be made by folding an edge of the fabric over and sewing the folded edge to the fabric while leaving the ends open through which a frame member can be inserted. In assembling the pet house, side frame members 30 are inserted into and through side sleeves 45 and end frame members 31 are inserted into and through end sleeves 46. The side and end members are joined together using connectors 32. The last connector has to be installed by tilting down the connector at an angle and placing the last member end into the connector opening and then tilting the connector and member upwardly to allow the member to slide into the connector. Once together, the floor material will securely hold the members in the connectors. The sleeves sewn into the mesh is preferred because the sleeves will support a greater amount of weight than other types of fasteners.

A lightweight fabric material is preferred for the pet supporting floor as such material allows air to pass up through the bottom of the structure and around the animal to help keep the animal cool in warm weather. Preferably, the fabric should also permit water to pass through the material down to the ground beneath the cot. A mesh material, such as an extrusion mesh material, for example a PVC coated polyester, is a good fabric to use as the holes are sufficiently large to allow air to flow through the material to keep the animal cool, but are small enough that they don't interfere with the animal's movement within the pet house and are comfortable for the animal to lie on. A mesh material also helps keep the pet house and animal clean. The small holes help to brush dirt out from the animal's fur. The loosened dirt falls through the holes in the mesh and settles below the pet house.

Figure 5:
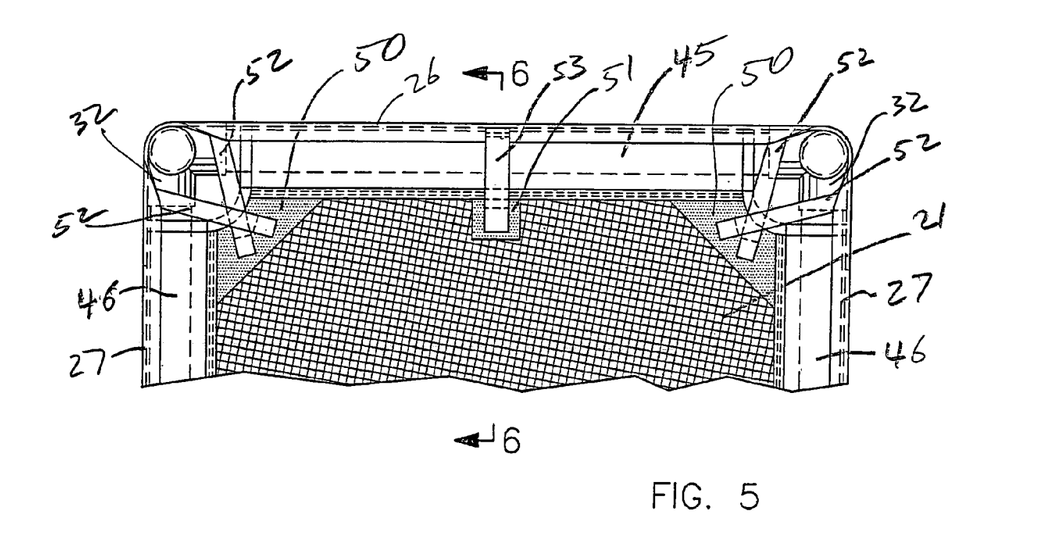
FIG. 5, a partial bottom view taken along the line 5-5 of FIG. 1 showing the bottom of the cot with the fabric cover forming the roof and walls attached thereto with Velcro straps.
Figure 6:
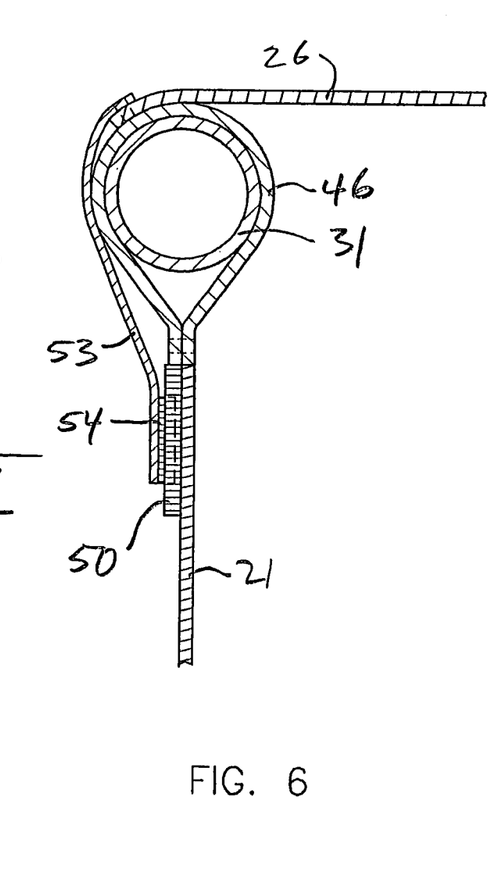
FIG. 6, a vertical section taken on the line 6-6 of FIG. 5 showing how the mesh bed and fabric cover forming the roof and walls are attached to the frame.
Figure 9:
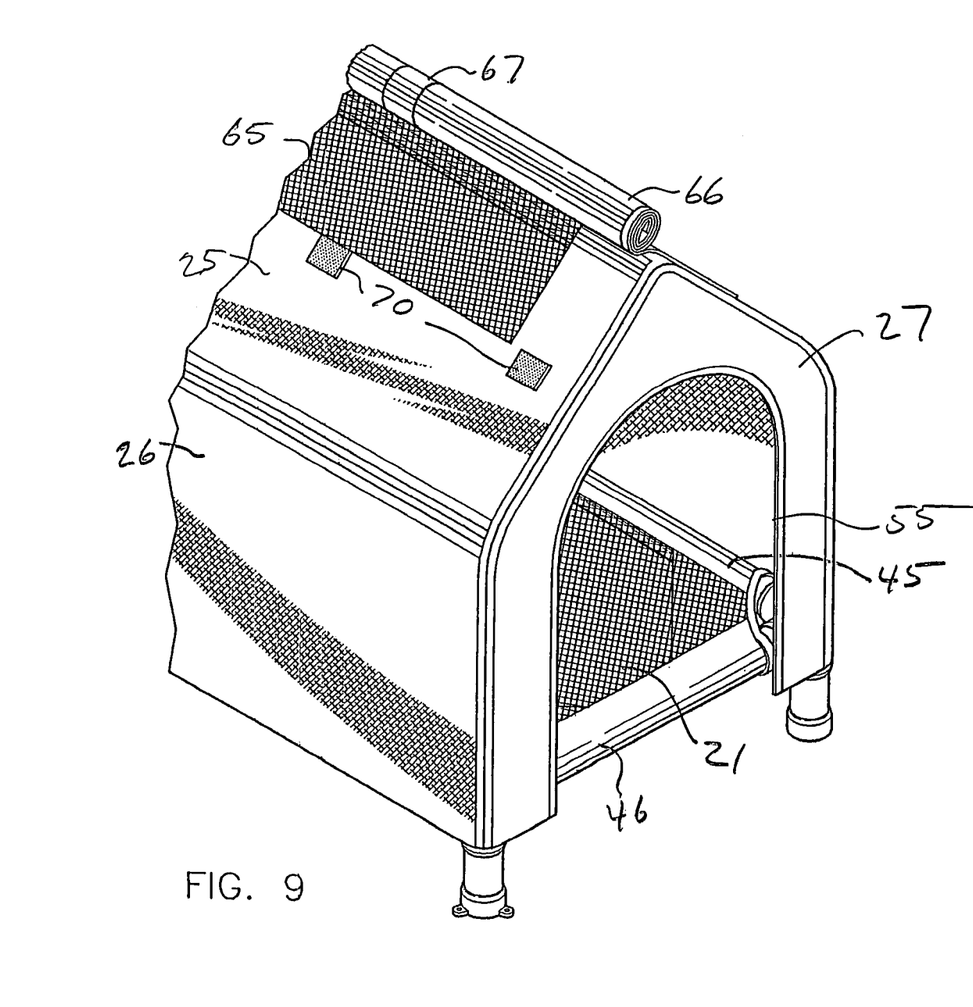
FIG. 9, a fragmentary pictorial view of the pet house with an arched opening and rolled up top vent.

The roof and walls of the upper portion are attached to the upper frame. It is preferred that a cover 49, FIG. 4, be formed to the shape of the upper frame to be easily pulled over and supported by the upper frame to form the roof and walls of the house. The appropriate material to use for the covering depends on the weather conditions in which the house will be used. A good all purpose material to use is a fabric material such as a UV treated nylon because of its excellent water resistance and its ability to protect the animal from both the sun and wind. A nylon cover helps keeps the house warm during winter and prevents water and air from coming in through the sides of the house. With a cover shaped to fit over the upper frame, the cover can be slid over the frame without requiring any additional assembly. While a shaped cover forming the roof and walls may be secured to the upper frame by merely pulling it over the frame, it is preferred to actually secure it to the frame, which may be done using any available fastening method. It is currently preferred that the pet supporting floor material include fasteners, such as corner patches 50, FIGS. 3, 5, and 6, and intermediate side patches 51 of one part of a hook and loop fastener material, for example the loop portion of the hook and loop fastener material, secured to the bottom of the material forming the floor. Corner straps 52, FIG. 4, and side straps 53 have patches 54 of the mating, for example the hook portion, of the hook and loop material attached thereto. Hook and loop material is commonly available under the trademark VELCRO. When the cover 49 is pulled over the upper frame as shown in FIGS. 1 and 9, straps 52 and 53 are pulled around the lower frame side and end members 30 and 31 as covered by sleeves 45 and 46, as shown in FIGS. 5 and 6, and fastened to the underside of the floor 21. The pads of fastening material 54 at the ends of the straps 52 and 53 mate with the patches of fastening material 50 and 51 on the underside of floor 21. Not having the cover permanently fastened to the upper frame makes removal of the cover for disassembly of the house and for cleaning the cover very easy.

By using PVC pipe and PVC pipe connectors, no glue is required for any part of the assembly. The entire frame can be quickly pulled apart and put back together allowing the house to be disassembled and transported to any desired location and then quickly and easily reassembled. The cot forming the pet supporting floor may be of various sizes and the size will vary with the size of the animal to be housed. Several standard sizes may be provided. It has been found that a cot size of 25"×18" works well for animals up to about 30 lbs, a cot size of 30"×23" works well for animals up to about 50 lbs, a cot size of 26"×28" works well for animals up to about 70 lbs, and a cot size of 42"×30" works well for animals up to about 90 lbs. The upper frame and upper portion of the house will be sized appropriately for the size of the floor.

The animal enters and exits the house through an entrance 55, FIG. 1, in an end wall 27 of the upper portion of the pet house. The opening can be of any size or shape as needed in order to accommodate different animal builds and personal style tastes. The entrance can merely be open as shown in FIG. 9, or a cover flap 56, FIG. 1, can be included to cover the entrance 55 when needed. The cover flap can be held in open condition as shown in FIG. 1 by strap 57 having a hook and loop material patch 58 which mates with a mating patch of hook and loop material 59 secured to end wall 27. If it is desired to be able to be able to hold the door in securely closed position, a zipper 60, FIG. 4, may be provided around a door flap 61 and entrance opening 62. With the zipper arrangement shown, the sides can be unzipped and the flap 61 rolled up and held in rolled open condition similarly as shown in FIG. 1, or the zipper may be completely unzipped and the door flap 61 removed.

The flap can be made of a mesh material so when closed, such as, for example, to close an animal in the house when transporting the animal, similarly to dog and cat cages currently used for transporting dogs or cats, or at other times when it is desired to cage the animal, the animal can see out the door through the mesh flap. Further, if desired for traveling or other situations when caging the animal, a separate travel cover made of mesh material or with walls made of mesh material can be provided. The user would remove the normal cover forming the roof and walls and replace it with the travel cover having at least mesh walls and a closable door flap such as shown in FIG. 4, and the animal could see through the walls and door. Such an arrangement could be used by hunters to move their dogs from one location to another without having the heavy metal dog cages currently sold.

It is preferred to provide a vent in the roof of the house to allow more ventilation than is provided by the airflow through cot fabric into a closed upper portion of the house, even with an open entrance door to the house. Thus, an opening covered by mesh material 65, FIG. 1, allows air to flow through the upper portion of the house. A flap 66 is secured along one edge of the vent in the roof of the house. The flap can be removed or rolled or folded back to open the vent and allow the air to flow through the house. FIG. 1 shows the flap 66 folded back (the broken lines show an intermediate position during folding) while FIG. 9 shows the flap rolled back and held in place by strap 67, which also shows in FIG. 1. Hook or loop material 68 on strap 67 mates with mating hook and loop material, not shown, to hold the flap in rolled position. Mating patches of hook and loop material 69 on flap 66 and 70 on roof 25 hold the flap in closed position over mesh material 65 forming the vent. This seals the top against rain or snow and provides extra warmth. The mesh material 65 covering the vent opening lets air pass into or out of the enclosure but keeps bugs and the sun out of the house.

To further protect an animal using the house during cold weather, an insulated blanket or pad 72, FIG. 10, can be placed over the cot material 21. This helps keep heat in the house when it is needed and prevents water from entering into the house through the cot. The insulated blanket may be made of various materials, such as the foil-like material commonly seen in emergency blankets. Any fastening material can be used to hold the insulating blanket in place. However, it is currently preferred that the blanket include straps 73 with patches of hook and loop material 74 at their ends which are pulled around the frame side and end members 30 and 31 and attached to mating hook and loop material pads 50 on the bottom of the floor material 21 in a manner similar to the straps 52 which hold the upper cover in place. Also, for cold weather, an additional upper cover can be placed over upper cover 49 or portions thereof, or a different upper cover 49 of heavier material may be used.

With the construction of the house with the upper portion removably secured to the lower cot portion, the lower cot portion can be used alone as a cot, such as shown in FIG. 10 without the extra insulating cover, when just a cot is desired, such as during hot weather. In such instance, if desired, caps 80 can be placed in connectors 34 to provide a finished look and cover the upwardly facing open ends of the connectors. The caps are easily removed when the upper portion is attached to the cot portion to form the full house.

While the upper frame of the house is shown as fitting into connectors 32 forming the corners of the lower frame, the upper frame could be removably attached to the lower frame in various other ways and could merely be placed over the lower frame such as by legs that are positioned on the surface supporting the lower frame with the legs adjacent to the periphery of the lower frame.

The pet house of the invention is lightweight, easily assembled and disassembled for transportation and storage, simple to clean, and well ventilated. When disassembled, the material forming the floor and upper cover can be flattened and the various frame pieces rolled up in the material to form a small package for transportation and storage. The floor of the house is raised up off the ground to keep the animal dry and prevent excess dirt from entering the house and the floor can be used separately as a cot for the animal.

The pet house of the invention can be used both as an inside and outside pet house. This provides an indoor pet house when desired. Since the pet house is lightweight and portable, it can be moved around very easily as opposed to the large heavy plastic or wood houses. Such large heavy house would not generally be used indoors. The pet house is also ideal for use on a patio or deck.

Whereas this invention is here illustrated and described with reference to embodiments thereof presently contemplated as the best mode of carrying out the invention in actual practice, it is to be realized that various changes may be made in adapting the invention to different embodiments without departing from the inventive concepts disclosed herein.

We claim:

1. A pet house comprising:
a substantially rectangular lower frame having four corners and constructed of tubular material with connectors at each of the four corners, and including four removable legs which rest on a supporting surface to support the frame on that supporting surface, wherein at least one leg includes a foot portion having a tab extending from the foot portion with a hole therein through which a stake can be positioned for staking the at least one leg to the supporting surface;
PVC coated polyester air permeable mesh material attached to the lower frame to form a pet supporting floor;
a preshaped substantially rigid and shape retaining upper frame constructed of tubular material removably connected to the lower frame through the connectors, the upper frame removable with respect to the lower frame to define a space above the pet supporting floor;

a cover that fits removably over the upper frame to create an enclosure over the pet supporting floor; and an opening in the cover where a pet can enter and leave the pet house.

2. A pet house according to claim 1, wherein the fabric forming the pet supporting floor includes sleeves through which portions of the lower frame extend to attach the fabric to the lower frame.

3. A pet house according to claim 2, wherein the lower frame separates at the connectors and is removable from the sleeves of the fabric forming the pet supporting floor.

4. A pet house according to claim 3, wherein the cover that fits over the upper frame is a fabric cover.

5. A pet house according to claim 4, additionally including a vent in the fabric cover and a flap removably positionable over the vent.

6. A pet house according to claim 5, additionally including a flap positionable over the opening where the pet can enter and leave the pet house to close the opening.

7. A pet house according to claim 5, additionally including a pad placed over the pet supporting floor to insulate the pet supporting floor.

8. A pet house according to claim 5, additionally including removable insulating material secured to at least a portion of the cover.

9. A pet house according to claim 3, wherein the fabric cover is made of a nylon material.

10. A pet house comprising:
a substantially rectangular lower frame having four corners and constructed of tubular material with connectors at each of the four corners, and including four removable legs which rest on a supporting surface to support the frame on that supporting surface, wherein at least one leg includes a foot portion having a tab extending from the foot portion with a hole therein through which a stake can be positioned for staking the at least one leg to the supporting surface;
fabric attached to the lower frame to form a pet supporting floor; a preshaped substantially rigid and shape retaining upper frame constructed of tubular material removably connected to the lower frame removable with respect to the lower frame to define a space above the pet supporting floor;
a cover that fits removably over the upper frame to create an enclosure over the pet supporting floor; and
an opening in the cover where a pet can enter and leave the pet house.

11. A pet house according to claim 10, wherein the cover that fits over the upper frame is a fabric cover.

12. A pet house according to claim 11, wherein the fabric cover is made of a nylon material.

13. A pet house according to claim 10, additionally including fastener portions secured to the fabric pet supporting floor which mate with fastener portions attached to the cover to secure the cover to the pet house.

14. A pet house according to claim 10, additionally including a vent in the cover and a flap removably positionable over the vent.

15. A pet house according to claim 10, additionally including a flap positionable over the opening where the pet can enter and leave the pet house to close the opening.

16. A pet house according to claim 10, additionally including a pad placed over the pet supporting floor to insulate the pet supporting floor.

17. A pet house according to claim 10, wherein the lower frame and fabric attached to the lower frame to form the pet supporting floor form an open pet supporting cot when the upper frame is removed from cooperation with the lower frame.

18. A pet house according to claim 10, where the fabric attached to the lower frame to form the pet supporting floor is air permeable.

19. A pet house according to claim 18, wherein the fabric attached to the lower frame to form the air permeable pet supporting floor is a mesh material.

20. A pet house according to claim 19, where the mesh material is PVC coated polyester.

* * * * *